(12) United States Patent
Hegemann et al.

(10) Patent No.: US 9,495,603 B2
(45) Date of Patent: Nov. 15, 2016

(54) METHOD FOR DETERMINING WHETHER A VEHICLE CAN PASS THROUGH AN OBJECT BY MEANS OF A 3-D CAMERA

(75) Inventors: Stefan Hegemann, Wangen (DE); Stefan Lueke, Bad Homburg (DE); Christoph Hassenpflug, Lindau (DE)

(73) Assignees: Conti Temic microelectronic GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 228 days.

(21) Appl. No.: 14/343,192

(22) PCT Filed: Jul. 6, 2012

(86) PCT No.: PCT/DE2012/100203
§ 371 (c)(1),
(2), (4) Date: Mar. 6, 2014

(87) PCT Pub. No.: WO2013/034138
PCT Pub. Date: Mar. 14, 2013

(65) Prior Publication Data
US 2014/0218481 A1 Aug. 7, 2014

(30) Foreign Application Priority Data
Sep. 7, 2011 (DE) ........................ 10 2011 113 077

(51) Int. Cl.
*G08G 1/16* (2006.01)
*G06K 9/00* (2006.01)
(Continued)

(52) U.S. Cl.
CPC ........... *G06K 9/00805* (2013.01); *G01S 17/89* (2013.01); *G01S 17/936* (2013.01); *G06T 7/0075* (2013.01); *G08G 1/165* (2013.01); *H04N 13/0271* (2013.01); *B60W 2420/42* (2013.01)

(58) Field of Classification Search
CPC B60W 2420/42; G01S 17/936; G01S 17/48; G01S 15/93; G01S 15/931; G01S 2015/932; G01S 2015/933; G01S 2015/934; G01S 2015/935; G01S 2015/936; G01S 2015/939; G06K 9/00805; G06T 7/0075; G08G 1/165; G08G 1/16; B60G 17/0165; B60Q 9/002; B60Q 9/003; B60Q 9/005; B60Q 9/008; B60Q 9/00
USPC .................................. 348/46, 148; 340/435
See application file for complete search history.

(56) References Cited

U.S. PATENT DOCUMENTS 5,530,420 A * 6/1996 Tsuchiya ................. G01S 11/12
                                                 180/167
5,710,553 A * 1/1998 Soares ..................... B60Q 9/00
                                                 180/167

(Continued)

FOREIGN PATENT DOCUMENTS

DE    197 43 580    4/1999
DE    102 34 645    2/2004
(Continued)

OTHER PUBLICATIONS

International Search Report of the International Searching Authority for International Application PCT/DE2012/100203, mailed Oct. 2, 2012, 2 pages, European Patent Office, HV Rijswijk, Netherlands.
(Continued)

*Primary Examiner* — Sath V Perungavoor
*Assistant Examiner* — Nathnael Aynalem
(74) *Attorney, Agent, or Firm* — W. F. Fasse

(57) ABSTRACT

A method and a device determine whether a vehicle can pass through a passage of an object, based on image data from a 3-D camera, which records an image of surroundings of the vehicle. A trajectory of the vehicle is ascertained. From the image data, it is determined whether an object located above the trajectory is recognized and whether the object has at least one connection to the ground. The dimensions and the shape of an entry area or a passage space between the object and the roadway, through which the vehicle is to pass, are determined from the image data. By comparing the dimensions and shape of the entry area or the passage space with the dimensions and shape of the vehicle, it is determined whether and how the vehicle can pass through the entry area or passage space.

21 Claims, 1 Drawing Sheet

(51) Int. Cl.
*G01S 17/89* (2006.01)
*G01S 17/93* (2006.01)
*G06T 7/00* (2006.01)
*H04N 13/02* (2006.01)

(56) References Cited

U.S. PATENT DOCUMENTS

| | | | |
|---|---|---|---|
| 6,677,986 | B1 | 1/2004 | Poechmueller |
| 7,259,660 | B2 | 8/2007 | Ewerhart et al. |
| 7,289,018 | B2 | 10/2007 | Ewerhart et al. |
| 8,352,112 | B2 | 1/2013 | Mudalige |
| 2005/0012603 | A1* | 1/2005 | Ewerhart ............ B60Q 9/00 340/435 |
| 2005/0143887 | A1* | 6/2005 | Kinoshita ............ G08G 1/166 701/45 |
| 2006/0013438 | A1* | 1/2006 | Kubota ............ B60W 40/04 382/103 |
| 2006/0245653 | A1* | 11/2006 | Camus ............ G06K 9/3241 382/199 |
| 2006/0287826 | A1* | 12/2006 | Shimizu ............ B60K 35/00 701/431 |
| 2008/0049150 | A1 | 2/2008 | Herbin et al. |
| 2008/0049975 | A1* | 2/2008 | Stiegler ............ G06T 7/20 382/104 |
| 2009/0121852 | A1 | 5/2009 | Breuer et al. |
| 2009/0169052 | A1* | 7/2009 | Seki ............ G06K 9/00805 382/103 |
| 2010/0098297 | A1 | 4/2010 | Zhang |
| 2010/0315505 | A1 | 12/2010 | Michalke et al. |

FOREIGN PATENT DOCUMENTS

| | | |
|---|---|---|
| DE | 102004015749 | 12/2004 |
| DE | 102004010752 | 9/2005 |
| DE | 102006053289 | 5/2008 |
| DE | 102009040170 | 4/2010 |
| DE | 102009050492 | 12/2010 |
| DE | 102009028644 | 2/2011 |
| DE | 102010013647 | 2/2011 |
| DE | 102011106173 | 2/2012 |
| EP | 1 209 485 | 5/2002 |
| EP | 1 892 688 | 2/2008 |
| JP | 10-062162 A | 3/1998 |
| JP | 11-139225 A | 5/1999 |
| JP | 2010-282615 A | 12/2010 |

OTHER PUBLICATIONS

PCT International Preliminary Report on Patentability including English Translation of PCT Written Opinion of the International Searching Authority for International Application PCT/DE2012/100203, issued Mar. 12, 2014, 7 pages, International Bureau of WIPO, Geneva, Switzerland.

German Search Report for German Application No. 10 2011 113 077.6, dated Jun. 11, 2012, 5 pages, Muenchen, Germany, with English translation, 5 pages.

Uwe Franke et al., "6D-Vision: Fusion of Stereo and Motion for Robust Environment Perception", in Proceedings of DAGM-Symposium, 2005, DaimlerChrysler AG, Stuttgart, Germany, pp. 216 to 223.

* cited by examiner

METHOD FOR DETERMINING WHETHER A VEHICLE CAN PASS THROUGH AN OBJECT BY MEANS OF A 3-D CAMERA

FIELD OF THE INVENTION

The invention relates to a method and to a device for determining whether a vehicle can pass through an object by means of a (spatially resolving) 3-D camera.

BACKGROUND INFORMATION

Objects extending over a roadway, such as bridges, tunnels, overhead road signs, are recognized as obstacles in particular by radar sensors, without there being a reliable estimation from the radar data as to whether a vehicle can pass through said obstacle. Even when using mono-cameras this estimation is often difficult to be made.

DE 10234645 B4 shows a vertical stereo camera arrangement for a vehicle, by means of which a clearance height of a bridge can be estimated with sufficient accuracy from the position of the horizontal lower edge of the tunnel entry and the position of a horizontal edge between the tunnel front side and the roadway level. It is further stated that a combination of a horizontal and a vertical stereo arrangement enables all horizontal and vertical infrastructural components of road traffic to be captured and measured.

DE 10 2004 015 749 A1 also shows a device for determining the possibility for a vehicle to pass through. In front of an obstacle the clearance width and/or the clearance height are measured by means of a sensor unit. In addition it is proposed to monitor the course of the roadway ahead by means of a sensor of the sensor unit so as to be able to determine a height difference between an ascending roadway and the position of a beam spanning the roadway, if necessary.

DE 10 2009 040 170 A1 proposes to use a sensor unit with e.g. a stereo camera in order to determine a maximum clearance height and/or a minimum ground clearance and to drive a running gear actuator unit such that the maximum clearance height is not exceeded by the total height of the vehicle and the minimum ground clearance is adhered to, as long as this is possible for the region of the roadway to be passed through.

One approach to object recognition in stereo image data processing is shown by U. Franke et al. in 6D-Vision: Fusion of Stereo and Motion for Robust Environment Perception in Proceedings of DAGM-Symposium 2005, pp. 216-223. Here, the positions and velocities of many pixels are estimated simultaneously in three dimensions.

It is apparent that the methods and devices of the state of the art have disadvantages and can, under certain circumstances, give inaccurate estimates, e.g. if the width and height of the entry region are not sufficient to ensure that an obstacle can be passed through.

SUMMARY OF THE INVENTION

In view of the above, it is an object of at least one embodiment of the present invention to overcome said disadvantages and to give a more reliable estimation as to whether and how a subject vehicle can pass through an object.

The above object can be achieved by an embodiment of a method according to the invention, in which a 3-D camera records at least one image of the surroundings of the vehicle, preferably in a (potential) direction of travel. At least one trajectory is ascertained, on which the vehicle is likely to move. Said trajectory can be ascertained using image data from the 3-D camera, but it could also be ascertained in a different manner; in any case positional characteristics of the ascertained trajectory are available to the method, which enables a comparison to be made with the image data from the 3-D camera.

From the image data of the 3-D camera it is determined whether an object located above the trajectory is recognized and whether said object has one or more connections to the ground.

Objects being within or close to the vehicle trajectory can also be determined as potential obstacles and it can be determined whether said objects form a connection above the trajectory.

Objects "hanging" above the roadway and having no connection to the ground in the region of the trajectory can also be determined.

For a corresponding object the dimensions and shape of the area between said object and the roadway (hereinafter also referred to as entry area) which is to be passed through according to the trajectory are determined from the image data. A determination of the shape can be based on object, clearance, image and/or disparity data from the 3-D camera and can use said data as a starting point for determining the precise dimensions of the area.

However, the method is not restricted to objects having a closed entry area within the image range. If, for example, an object is recognized which hangs above the roadway and which does not have a connection to the ground within the image range due to the pillars of the bridge being outside the field of view of the 3-D camera, only the (partial) area between the hanging object and the roadway which is shown in the image is measured and its shape determined. The same procedure can be applied if, for example, only the lateral bridge pillars of a very high bridge are shown in the image.

A more precise determination of the dimensions and the shape of the entry area can be advantageously achieved by sensor fusion, i.e. fusing the data from the 3-D camera with the data from other sensors, such as ultrasound, lidar, radar, etc.

By comparing the dimensions and the shape of the entry area with those of the vehicle, it is determined whether and how the vehicle can pass through the object. This means that it is also possible to ascertain a precise passage trajectory or a passage corridor along which the vehicle will not collide with the object.

This information can be preferably communicated to the driver. The driver can also be assisted in driving into the object or the vehicle could be automatically steered into the object if passing through said object is possible.

If a passage is not possible, a warning can be issued to the driver or even an intervention be made in the vehicle control system.

Due to the precise determination of the dimensions and in particular the shape of a passage area, the invention also enables the recognition that a vehicle does not fit through a passage shape even though the total height of the vehicle is below the maximum clearance height of the object. This is the case, for example, if a truck having a rectangular cross-section wants to drive through a rounded tunnel, because the lateral heights of the tunnel are too low.

In an advantageous embodiment, in addition to the dimensions and shape of the two-dimensional entry area, the dimensions and shape of the three-dimensional passage space between the object and the roadway surface through which the vehicle is to pass are also determined or estimated from the image data. This can be done by means of the image data from the 3-D camera. If parts of the passage space which can be passed through are hidden in the image data, the shape and dimensions of the actual passage space can be estimated from the data available.

The determination of the area or the space to be passed through can preferably be made using a depth map, in particular a disparity map, from the image data provided by the 3-D camera.

From the depth map or disparity map, edges of the entry area and/or the space which can be passed through can be advantageously determined.

As an alternative, the edges of the entry area can be determined from the image data by means of an edge detection algorithm, for example by means of a Canny or Sobel operator.

According to an advantageous further development of the invention the determination of the dimensions and shape of the entry area or the space which can be passed through, made using the depth map, can be combined with those from edge detection by means of an intensity or color analysis of the pixels.

The dimensions and shape of the area or the space to be passed through can be preferably determined via a sequence of multiple images provided by the 3-D camera. Thus, for example, the spatial shape of a tunnel which has been partially hidden at the beginning can be updated and completed as to its dimensions when advancing into the tunnel.

The dimensions and shape of the area or the space to be passed through can be determined due to the motion of the vehicle itself, taking into account in particular the motion of the 3-D camera.

For this purpose, a 3-D scene reconstruction can be made from the image data of the 3-D camera, for example using the optical flow method.

Advantageously a determination of the spatial points of the objects closest to the vehicle or the 3-D camera is made in different height segments, assuming that the spatial points are vertically above one another (e.g. in the case of rectangular segments of entry areas).

Here, the measured distances in the longitudinal and transverse directions of the vehicle or the trajectory can be preferably weighted differently.

The 3-D camera is preferably a stereo camera or a photonic mixing device camera or PDM sensor.

The invention further comprises a device for determining whether a vehicle can pass through an object. The device comprises a 3-D camera for recording at least one image of the surroundings ahead of the vehicle. Moreover, the device comprises means for ascertaining at least one trajectory on which the vehicle is likely to move. In addition means are provided for determining from the image data of the 3-D camera whether an object located above the trajectory is recognized and whether said object has one or more connections to the ground. Finally, means are provided for determining whether a passage through the object is possible by determining from the image data the dimensions and shape of the area or space between the object and the roadway.

BRIEF DESCRIPTION OF THE DRAWINGS

The invention will now be explained with reference to figures and exemplary embodiments, in which.

DETAILED DESCRIPTION OF EXAMPLE EMBODIMENTS OF THE INVENTION

Figure 1:
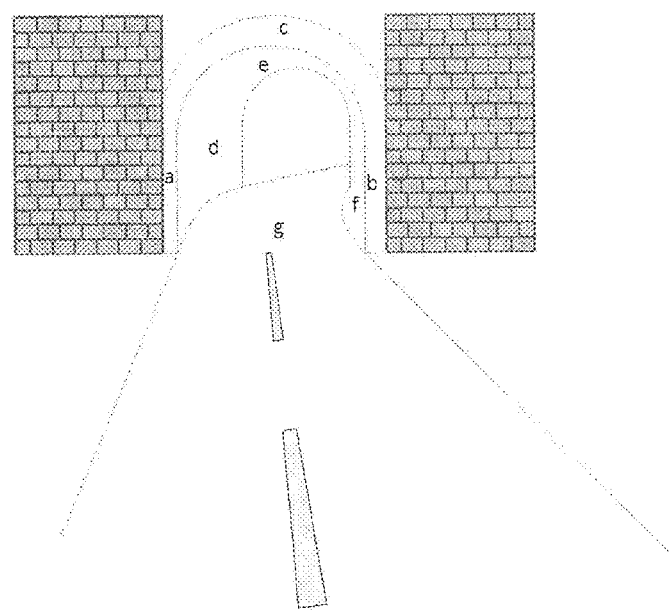
FIG. 1 shows a tunnel, the entry area of which is arc-shaped and inside of which the course of the roadway is that of a curve.

In FIG. 1, a tunnel is illustrated having an arc-shaped entry area. Due to this, the maximum clearance height for a vehicle depends on several aspects:

In addition to the maximum height of the vehicle, it also depends on the shape (height profile) of the vehicle, the width of the vehicle and the lateral position of the vehicle inside the tunnel.

The arc-shaped entry area of the tunnel is defined by the left (a) and right (b) boundaries of the tunnel entry, both extending vertically, and by the upper boundary (c) of the tunnel entry, which is curved.

The interior space of the tunnel, i.e. the space which can be passed through, is defined by the left (d) and right (f) boundaries of the inside of the tunnel, which could be referred to as tunnel walls, and by the tunnel ceiling (e) (or the upper boundary of the inside of the tunnel). The roadway (g) describes a curve inside the tunnel. The interior space of the tunnel is therefore curved accordingly in the longitudinal direction. The shape of the space (the tunnel) to be passed through is predetermined by the interior space of the tunnel, the roadway surface (g) acting as a bottom boundary.

Edges of the entry area extend between the boundaries of the tunnel entry (a, b, c) and the boundaries of the inside of the tunnel (d, f, e). The bottom edge of the entry area extends where the roadway surface (g) is intersected by the area defined by the edges of the tunnel entry described above.

The image data of a 3-D camera can be used to determine the shape and dimensions of both the (entry) area and the space to be passed through.

Functions such as the following can be realized using these determinations:
  recognition of bridges or tunnels on the roadway
  recognition that the vehicle is currently inside a tunnel (passage has boundaries on all sides)
  assistance in navigating, maneuvering and entering through narrow alleys, parking garages, gates and garages
  automated entering of narrow sites such as garages, driveways, alleys, gateways, passages under bridges, etc.
  Accidents and damage can be avoided by measuring the shape of an area or a space between one or more objects and the roadway. For this purpose, a warning can be issued to the driver or an intervention such as automatic braking can be made in the vehicle control system.

Figure 2:
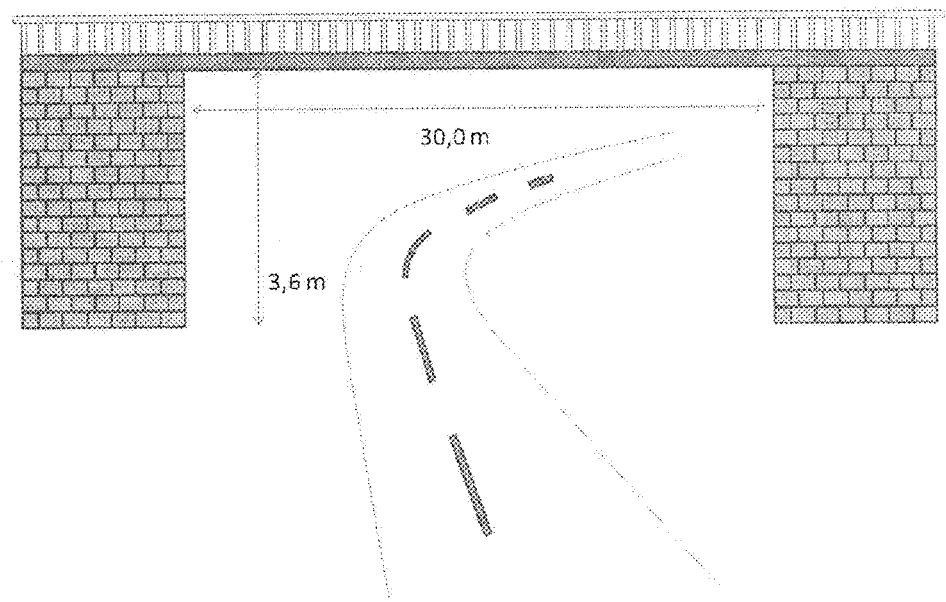
FIG. 2 shows a bridge spanning the roadway on which the vehicle itself is traveling.

In FIG. 2 a bridge is illustrated which extends over the roadway on which the vehicle itself is traveling. The bridge has no connection to the ground in close proximity to the roadway. The two pillars of the bridge are connected above the roadway, however. The clearance width and height can be determined by means of a 3-D camera, e.g. a stereo camera. If the field of view of the stereo camera was smaller, the bridge would have no connection to the ground in the field of view, because the bridge pillars would not be included in the image. In this case the clearance height below the bridge can be determined from the image data without difficulty.

Even though this determination is possible in principle also with the state of the art and is usually sufficient, there may be situations which are critical: e.g. a local elevation of the ground on the roadway under the bridge, also for example due to an object on the roadway (not illustrated in FIG. 2). This leads to a local reduction in the maximum height which can be passed through, which in turn can lead to an accident. By means of the stereo camera the space between the undersurface of the bridge and the roadway can be measured precisely according to a present method, thus also taking into account local elevations of the roadway (or sagged parts of the undersurface of the bridge).

The invention claimed is:

1. A method of determining whether a vehicle can pass through or pass under an object, while the vehicle is driving on a roadway, wherein the roadway is part of a ground, said method comprising steps:
   with a 3-D camera, recording at least one image of surroundings ahead of the vehicle, to provide image data;
   ascertaining at least one trajectory along which the vehicle is likely to move;
   from at least the image data of the 3-D camera, detecting an object that includes an upper portion located above the trajectory,
   from at least the image data of the 3-D camera, detecting whether the object includes at least one connection portion that connects the upper portion to the ground,
   from at least the image data of the 3-D camera, determining dimensions and a shape of a 2-dimensional entry area that is bounded vertically between the upper portion of the object and the roadway, and that is bounded laterally by any said connection portion that has been detected, and
   determining whether it is possible for the vehicle driving along the trajectory to pass through the 2-dimensional entry area by fitting vertically and laterally in the 2-dimensional entry area.

2. The method according to claim 1, further comprising, from at least the image data of the 3-D camera, determining dimensions and a shape of a 3-dimensional passage space that extends along the roadway, and that is bounded vertically between the upper portion of the object and the roadway, and that is bounded laterally by any said connection portion that has been detected.

3. The method according to claim 2, wherein the recording of the at least one image comprises recording a sequence of images, the image data comprise data that represent the sequence of images, and the determining of the dimensions and the shape of the 3-dimensional passage space comprises evaluating the data that represent the sequence of images.

4. The method according to claim 3, wherein the determining of the dimensions and the shape of the 3-dimensional passage space further takes into account a motion of the 3-D camera.

5. The method according to claim 1, further comprising producing a depth map from the image data of the 3-D camera, and wherein the detecting of the object and the detecting of the at least one connection portion comprise evaluating the depth map.

6. The method according to claim 5, wherein the depth map is a disparity map.

7. The method according to claim 5, further comprising detecting edges of the 2-dimensional entry area from the depth map.

8. The method according to claim 5, further comprising detecting edges of the 2-dimensional entry area from the image data by performing an edge detection algorithm, and wherein the determining of the dimensions and the shape of the 2-dimensional entry area is performed using the depth map and the detected edges.

9. The method according to claim 1, further comprising detecting edges of the 2-dimensional entry area from the image data by performing an edge detection algorithm.

10. The method according to claim 9, wherein the determining of the dimensions and the shape of the 2-dimensional entry area is performed using the detected edges.

11. The method according to claim 1, wherein the recording of the at least one image comprises recording a sequence of images, the image data comprise data that represent the sequence of images, and the determining of the dimensions and the shape of the 2-dimensional entry area comprises evaluating the data that represent the sequence of images.

12. The method according to claim 11, wherein the determining of the dimensions and the shape of the 2-dimensional entry area further takes into account a motion of the 3-D camera.

13. The method according to claim 1, further comprising producing a 3-D scene reconstruction from the image data of the 3-D camera.

14. The method according to claim 1, wherein the 3-D camera comprises a stereo camera.

15. The method according to claim 1, wherein the 3-D camera comprises a photonic mixing device camera.

16. The method according to claim 1, wherein the determining of whether it is possible for the vehicle to pass through the 2-dimensional entry area comprises comparing dimensions of the vehicle, a shape of the vehicle, and a lateral position of the vehicle on the trajectory on the roadway, respectively to the dimensions of the 2-dimensional entry area, the shape of the 2-dimensional entry area, and a lateral position of the 2-dimensional entry area relative to the trajectory.

17. The method according to claim 1,
   wherein the dimensions and the shape of the 2-dimensional entry area that are determined include entry area parameters regarding at least a shape of an upper boundary of the entry area bounded by the upper portion of the object, a height of the upper boundary above the roadway, and a lateral position of the shape of the upper boundary relative to the trajectory of the vehicle;
   wherein the step of determining whether it is possible for the vehicle driving along the trajectory to pass through the entry area comprises sub-steps:
      a) obtaining vehicle data regarding at least a cross-sectional shape of the vehicle, a height of the cross-sectional shape extending above the roadway, and a lateral position of the cross-sectional shape relative to the trajectory of the vehicle;
      b) comparing the vehicle data with the entry area parameters to produce a corresponding comparison result; and
      c) in response to and dependent on the comparison result, determining whether the vehicle driving along the trajectory can pass without collision through the entry area, and producing a corresponding clearance result;
   and
   wherein the method further comprises a step d) in response to and dependent on the clearance result, outputting to a driver of the vehicle an information indicative of the clearance result, or automatically intervening in a steering control system or a braking control system of the vehicle.

18. The method according to claim 17,
   wherein the sub-step b) comprises comparing the cross-sectional shape of the vehicle with the shape of the upper boundary of the entry area, comparing the height of the cross-sectional shape of the vehicle with the height of the upper boundary, and comparing the lateral position of the cross-sectional shape of the vehicle with the lateral position of the shape of the upper boundary of the entry area;

wherein the sub-step c) determines that the vehicle driving along the trajectory cannot pass without collision through the entry area; and wherein the step d) comprises the automatic intervening in the steering control system or the braking control system.

19. The method according to claim 17,
wherein the sub-step c) determines that the vehicle driving along the trajectory cannot pass without collision through the entry area,
wherein the method further comprises determining an alternative trajectory that the vehicle can drive along to pass without collision through the entry area, and
wherein the method further comprises outputting to the driver a further information indicative of the alternative trajectory, or automatically intervening in the steering control system to steer the vehicle to the alternative trajectory.

20. The method according to claim 2, wherein the 3 dimensional passage space extends to a far end of the upper portion of the object, and wherein the method further comprises determining passage parameters regarding a shape, a height, and a lateral position of the passage space along the trajectory to the far end of the upper portion of the object.

21. A device for determining whether a vehicle can pass through or pass under an object, while the vehicle is driving on a roadway, wherein the roadway is part of a ground, said device comprising:
- a 3-D camera configured and arranged to record at least one image of surroundings ahead of the vehicle;
- a circuit arrangement configured to ascertain at least one trajectory on which the vehicle is likely to move;
- a circuit arrangement configured to determine from the image data of the 3-D camera:
  - whether an object is present that includes an upper portion located above the trajectory, and
  - whether said object has at least one connection portion that connects the upper portion to the ground; and
- a circuit arrangement configured to determine, from the image data, dimensions and a shape of a 2-dimensional entry area bounded vertically between the upper portion of the object and the roadway, and to determine, from the dimensions and the shape of the entry area, whether it is possible for the vehicle driving along the trajectory to pass through the entry area.

* * * * *